United States Patent [19]

Blaylock

[11] 4,280,607
[45] Jul. 28, 1981

[54] CLUTCH THROW-OUT BEARING PLATE

[76] Inventor: Tommy J. Blaylock, 2448 NW. 3, Oklahoma City, Okla. 73107

[21] Appl. No.: 97,252

[22] Filed: Nov. 26, 1979

Related U.S. Application Data

[63] Continuation-in-part of Ser. No. 870,158, Jan. 17, 1978, Pat. No. 4,213,522, and a continuation-in-part of Ser. No. 925,066, Jul. 17, 1976, Pat. No. 4,181,207.

[51] Int. Cl.³ .................... F16D 13/71; F16D 23/14
[52] U.S. Cl. ............................ 192/98; 192/89 B; 192/110 B
[58] Field of Search .......... 192/110 B, 110 R, 109 A, 192/99 A, 99 R, 89 B, 70.27, 98

[56] References Cited

U.S. PATENT DOCUMENTS

| 1,998,613 | 4/1935 | Ford | 192/110 R |
| 2,630,897 | 3/1953 | Porter | 192/110 R |
| 2,863,537 | 12/1958 | Root | |
| 2,952,453 | 9/1960 | Haussermann | 192/89 B |
| 3,093,228 | 6/1963 | Binder | 192/89 B |
| 3,241,643 | 3/1966 | Montgomery | 192/110 B |
| 3,963,105 | 6/1976 | Ernst et al. | 192/89 B |

FOREIGN PATENT DOCUMENTS 753675 7/1956 United Kingdom ............... 192/70.27

*Primary Examiner*—George H. Krizmanich
*Attorney, Agent, or Firm*—Robert K. Rhea

[57] ABSTRACT

In a vehicle clutch construction, a flat plate ring is interposed between the clutch throw-out bearing and clutch release fingers and maintained concentric with the throw-out bearing by sockets forming a flexible connection with the clutch release fingers.

1 Claim, 6 Drawing Figures

U.S. Patent  Jul. 28, 1981  4,280,607
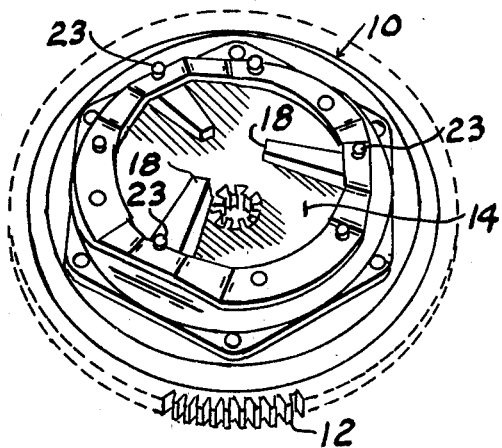
FIG. 1
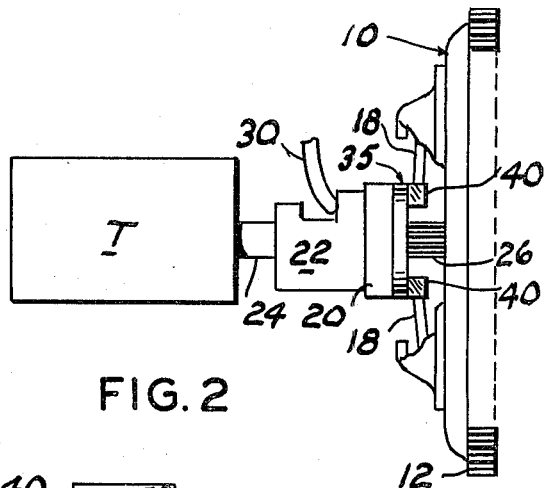
FIG. 2
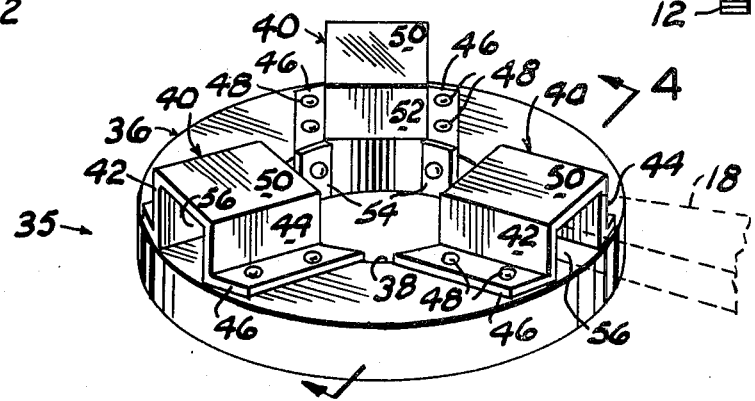
FIG. 3
FIG. 4
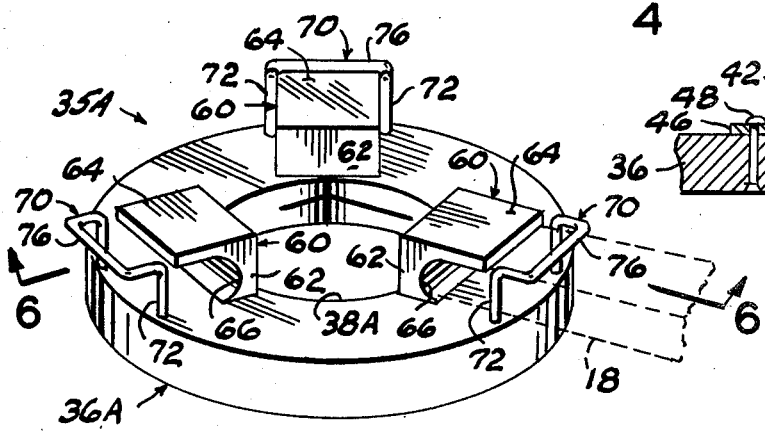
FIG. 5
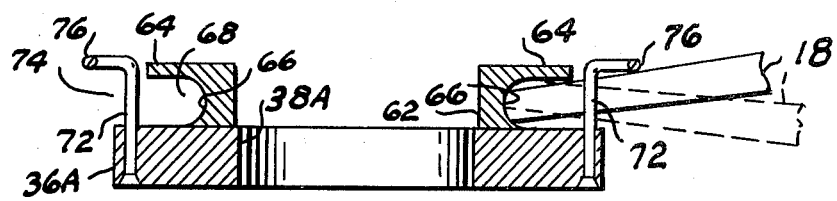
FIG. 6

CLUTCH THROW-OUT BEARING PLATE

CROSS REFERENCE TO RELATED APPLICATIONS

This application is a continuation-in-part of two applications filed by me in the United States Patent and Trademark Office on Jan. 17, 1978, Ser. No. 870,158, now U.S. Pat. No. 4,213,522 and July 17, 1978, Ser. No. 925,066, now U.S. Pat. No. 4,181,207 respectively, both entitled Clutch Throw-Out Bearing Plate.

BACKGROUND OF THE INVENTION

1. Field of the Invention

The present invention relates to vehicle clutches and more particularly to a bearing pressure plate to be installed between the throw-out bearing and clutch release fingers.

In a vehicle clutch construction, a clutch throw-out bearing surrounds the transmission input shaft and is moved axially along this shaft by the clutch pedal for engaging the clutch release fingers to separate the clutch pressure plate from the stationary clutch disk secured to the adjacent face of the flywheel thus disengaging the clutch for shifting transmission gears. Contact between the throw-out bearing and the clutch release fingers results in a three-point frictional wearing-out action of the throw-out bearing necessitating its replacement. This is a time consuming and relatively expensive repair in that the gear train, including the transmission of the vehicle, must be disconnected from the clutch in order to remove the old throw-out bearing and install a new one.

2. Description of the Prior Art

Prior patents generally relate to the construction of throw-out bearing and connectors joining clutch release fingers to the throw-out bearing rather than a friction reducing bearing plate to be interposed between the throw-out bearing and clutch release fingers for minimizing wear of the throw-out bearing as a result of the clutch fingers frictional rotation on the bearing face.

U.S. Pat. No. 2,863,537 discloses a heavy duty friction clutch including a throw-out collar coaxially mounted on one end of a sleeve surrounding the drive shaft and supporting the throw-out bearing at its other end portion with adjusting nuts interposed between the throw-out collar and throw-out bearing for adjusting the spacing therebetween and insuring application of braking disks for stopping angular rotation of the drive shaft while shifting gears. The periphery of the throw-out collar is provided with sockets for nesting the adjacent end portion of the clutch release fingers.

This invention is distinctive over this patent and my copending applications by providing an annular washer-like plate surrounding the drive shaft and interposed between the inward end of the clutch fingers and the adjacent face of the throw-out bearing. The annular plate loosely surrounds the drive shaft and its surface opposite the throw-out bearing has a plurality of radially open socket forming members secured thereto for nesting the inward end portion of the clutch release fingers and maintaining the annular plate concentric with respect to the vehicle drive shaft in its movement toward and away from the throw-out bearing as the clutch pressure plate is engaged and released.

SUMMARY OF THE INVENTION

In the preferred embodiment, a centrally bored generally cylindrical bearing plate is interposed between the clutch throw-out bearing and one face of the clutch release fingers of a vehicle clutch concentric with the transmission input shaft. A plurality of hollow housings are secured, in circumferential spaced relation, to the surface of the bearing plate opposite the throw-out bearing to form radially open sockets for receiving the adjacent inward end portion of the respective clutch release finger thus permitting movement of the clutch release fingers in a radial direction relative to the bearing plate as the clutch is engaged and released.

In another embodiment, a plurality of lugs are secured to the surface of the bearing plate opposite the throw-out bearing in circumferentially spaced relation. Each lug is characterized by a radially outward arcuate surface engaged by the respective clutch release finger inward end portion and a lip end portion overlying the adjacent face of the bearing plate and the inward end portion of the respective clutch finger to insure movement of the bearing plate toward and away from the throw-out bearing as the clutch is engaged and released. A like plurality of wire-like loops, secured to the bearing plate in radially outward spaced relation with respect to the lugs, transversely bridge the respective inward end portion of the clutch release fingers thus forming a socket, in combination with the lugs, and maintain the clutch release fingers aligned with the lugs.

The principal object of this invention is to provide a friction reducing bearing plate to be interposed between the clutch throw-out bearing and clutch release fingers to minimize wear on the clutch throw-out bearing and increase its useful life.

BRIEF DESCRIPTION OF THE DRAWINGS

FIG. 1 is a perspective view of a vehicle clutch connected with a flywheel illustrating the relative position of the clutch release fingers which frictionally engage one face of a clutch throw-out bearing;

FIG. 2 is a side elevational view of a vehicle clutch connected with a transmission through an input shaft having a throw-out bearing thereon with parts of the clutch broken away for clarity and illustrating the clutch throw-out bearing and pressure plate in clutch released position;

FIG. 3 is a perspective view, to a larger scale, of one embodiment of the throw-out bearing plate illustrating, by dotted lines, the relative position of one clutch finger;

FIG. 4 is a fragmentary vertical cross sectional view taken substantially along the line 4—4 of FIG. 3;

FIG. 5 is a perspective view of another embodiment of the throw-out bearing plate similarly illustrating, by dotted lines, the relative position of one clutch release finger; and, FIG. 6 is a vertical cross sectional view taken substantially along the line 6—6 of FIG. 5 and illustrating, by solid and dotted lines, the movement of one clutch release finger relative to the bearing plate as the clutch is released and engaged.

DESCRIPTION OF THE PREFERRED EMBODIMENTS

Like characters of reference designate like parts in those figures of the drawings in which they occur.

In the drawings:

The reference numeral 10 indicates a conventional vehicle clutch secured to one face of a flywheel 12. The clutch 10 includes a pressure plate 14 normally urged into frictional engagement with a clutch disk by a plurality of springs, neither being shown, contained by the clutch. The clutch pressure plate 14 is axially moved away from the clutch disk to release the clutch by three clutch release levers or fingers 18 having their free end portions normally spring biased axially away from the clutch toward a clutch throw-out bearing 20 supported by a throw-out bearing support 22. The clutch pressure plate 14 is adjusted relative to the clutch disk by a like plurality of bolts 23, one for each clutch finger. The clutch throw-out bearing 20 and its support 22 coaxially surrounds a transmission input shaft 24 extending between the vehicle transmission T and the clutch 10 with its splined forward end portion 26 cooperatively surrounded by the clutch pressure plate 14. The free end portion of the three clutch release fingers 18 normally frictionally contact the adjacent face of the throw-out bearing 20 when a clutch pedal operated yoke or lever 30 moves the throw-out bearing 20 toward the clutch. Frictional contact of the clutch throw-out bearing, with the clutch release fingers rotating with the clutch, results in undue wear on the adjacent face of the clutch throw-out bearing.

The above description is conventional with several truck vehicle clutches and throw-out bearings and is set forth to show the structure with which the present invention is intended to be used.

Referring more particularly to FIGS. 3 and 4, the numeral 35 indicates a preferred embodiment of the bearing plate. The bearing plate 35 comprises an annular flat ring 36 of a selected thickness having a diameter substantially equal with respect to the diameter of the throw-out bearing 20 and a bore 38 which loosely surrounds the transmission input shaft splines 26. A plurality of socket forming housings 40, one for each clutch finger 18, are secured to the surface of the bearing plate 36 opposite the throw-out bearing 20 in circumferentially spaced relation.

As viewed in FIG. 3, each housing 40 comprises a pair of vertical side walls 42 and 44 having laterally projecting flanges 46 flatly secured to the adjacent surface of the ring 36 by rivets 48, or the like. The housing walls 42 and 44 are joined by a top wall 50 and a rear wall 52 extending downwardly coextensive with the thickness of the ring 36 and provided with laterally projecting wings 54 which are similarly secured to the wall forming the bore 38. The end of the housing opposite the back wall 52 is open thus forming a radially open socket 56 for nesting the inwardly disposed end portion of the respective clutch finger 18. The height of the walls 42 and 44 is such that sufficient space is provided to permit necessary movement of the respective clutch fingers in a plane normal to the plane of the ring 36 as the clutch is engaged and released. The spacing between the walls 42 and 44 is such that the clutch fingers maintain the ring 36 substantially coaxial with respect to the transmission input shaft splined portion 26 and throw-out bearing 20.

Referring more particularly to FIGS. 5 and 6, the numeral 35A indicates another embodiment of the bearing plate comprising a substantially identical annular plate 36A having a bore 38A loosely surrounding the transmission input shaft splines 26. A plurality of lugs 60, one for each clutch release finger 18, are secured, in circumferentially spaced relation, to the surface of the plate 36A opposite the throw-out bearing 20. Each lug 60 is substantially L-shaped in side elevation having the end of its foot portion 62 rigidly secured, as by welding, adjacent the bore 38A with the leg portion of the L-shape projecting radially outward to form a lip 64 overhanging the adjacent surface of the plate 36A. The radially outward facing surface of the lug foot portion 62 is arcuately curved transversely, to form a concave surface 66, merging with the adjacent surface of the bearing plate 36A and the depending surface of the overhanging lip portion 64 thus forming a laterally open substantially J-shaped slot 68 which loosely receives the adjacent inward end portion of the respective clutch finger 18.

The outwardly directed end portion of the respective lip portion 64 terminates in radially inward spaced relation with respect to the cylindrical plane generated by the periphery of the bearing plate 36A. A like plurality of wire-like substantially inverted U-shaped clips 70, having their legs 72 secured to the bearing plate 36A, transversely span, in bridging relation, the inward end portion of the respective clutch finger 18 thus forming, in combination with the lugs 70, radially open sockets 74. The spacing between the clip legs 72 is such that they prevent lateral movement of the respective clutch finger relative to the J-shaped slots 68. Intermediate their length, the clip legs 72 are turned radially outward in parallel relation and dispose the respective clip bight portion 76 in outward spaced relation with respect to the cylindrical plane generated by the periphery of the bearing plate 36A and slightly above the plane of the depending surface of the respective lip portion 64 to permit pivoting movement of the respective end portion of the clutch fingers 18 in a plane normal to the plane of the bearing plate 36A.

OPERATION

On existing vehicles the bearing plate 35 or 35A is installed by disconnecting the transmission gear train from the vehicle to permit installation of a new throw-out bearing 20 and interposing the bearing plate 35 or 35A between the new bearing 20 and the clutch 10.

With the components of the bearing plate assembled as shown by FIGS. 3 or 5, the clutch release fingers are expanded outwardly by loosening the bolts 23 until the selected bearing plate may be positioned therebetween with the respective sockets disposed for receiving the inwardly projecting end portion of the respective clutch finger 18. The clutch bolts 23 are then progressively tightened until the bearing plate is supported by the clutch finger end portions within the respective socket when the clutch fingers and bearing plate are in substantially the position shown by FIG. 2.

Obviously the invention is susceptible to changes or alterations without defeating its practicability. Therefore, I do not wish to be confined to the preferred embodiment shown in the drawings and described herein.

I claim:

1. In a vehicle clutch assembly having a flywheel and a clutch pressure plate movable toward and away from the flywheel by a plurality of radially inwardly projecting clutch release fingers, a transmission input shaft connecting the clutch pressure plate with a transmission and having a clutch throw-out bearing coaxially mounted on the shaft and movable toward and away from the inwardly directed end portions of said clutch release fingers, the improvement comprising:

a cylindrical centrally bored bearing plate loosely surrounding said input shaft and diametrically substantially equal with respect to said throw-out bearing and interposed between said throw-out bearing and the inwardly directed end portions of said clutch release fingers; and, socket forming means secured to the surface of said bearing plate opposite said throw-out bearing in circumferentially spaced relation for forming radially open sockets nesting the inwardly directed end portions of said clutch release fingers, said socket forming means including a plurality of housings, each said housing consisting of parallel radially disposed side walls, normal to the plane of the bearing plate, transversely joined by a top wall and an end wall adjacent the bore of the bearing plate, whereby said end walls, by contact with the adjacent end surface of the respective clutch release finger, substantially coaxially supports the pressure plate with respect to the throw-out bearing.

* * * * *